United States Patent

Gentile

[15] 3,695,128
[45] Oct. 3, 1972

[54] MACHINE FOR FORMING CAVITIES IN FOAM PADS AND TRIMMING SAME

[72] Inventor: Carlos A. Gentile, Westminster, Calif.

[73] Assignee: Califoam Corp. of America, Compton, Calif.

[22] Filed: Sept. 14, 1970

[21] Appl. No.: 71,758

[52] U.S. Cl. ...................... 83/1, 83/20, 83/176, 83/214
[51] Int. Cl. ..................... B26d 3/00, B26d 7/14
[58] Field of Search......83/1, 4, 19, 20, 17, 176, 213, 83/214, 408, 581, 517, 618

[56] References Cited

UNITED STATES PATENTS

| | | | |
|---|---|---|---|
| 1,177,293 | 3/1916 | Anderson | 83/1 |
| 1,814,197 | 7/1931 | Vernet | 83/1 |
| 1,776,861 | 9/1930 | Leichner | 83/517 |
| 1,868,932 | 7/1932 | Vernet | 83/1 |
| 3,186,271 | 6/1965 | Kaiser | 83/4 |

Primary Examiner—Andrew R. Juhasz
Assistant Examiner—Leon Gilden
Attorney—Huebner & Worrel

[57] ABSTRACT

Machine for operating on foam pads or blanks used as fillers in automobile seat upholstering, which require one or more cavities in the back of the pad, the machine including a table die with an aperture defining the outline of the cavity, a primary pressure plate adapted to compress the pad and cause material of the pad to form a bulge through the aperture of the die, a secondary pressure plate below the die working upwardly against the bulge, a reciprocating knife travelling adjacent the bottom of the die to cut off the material of the bulge, in conjunction with descending knives, adjustable as to inclination, for cutting the ends to size.

12 Claims, 10 Drawing Figures

INVENTOR.
CARLOS GENTILE

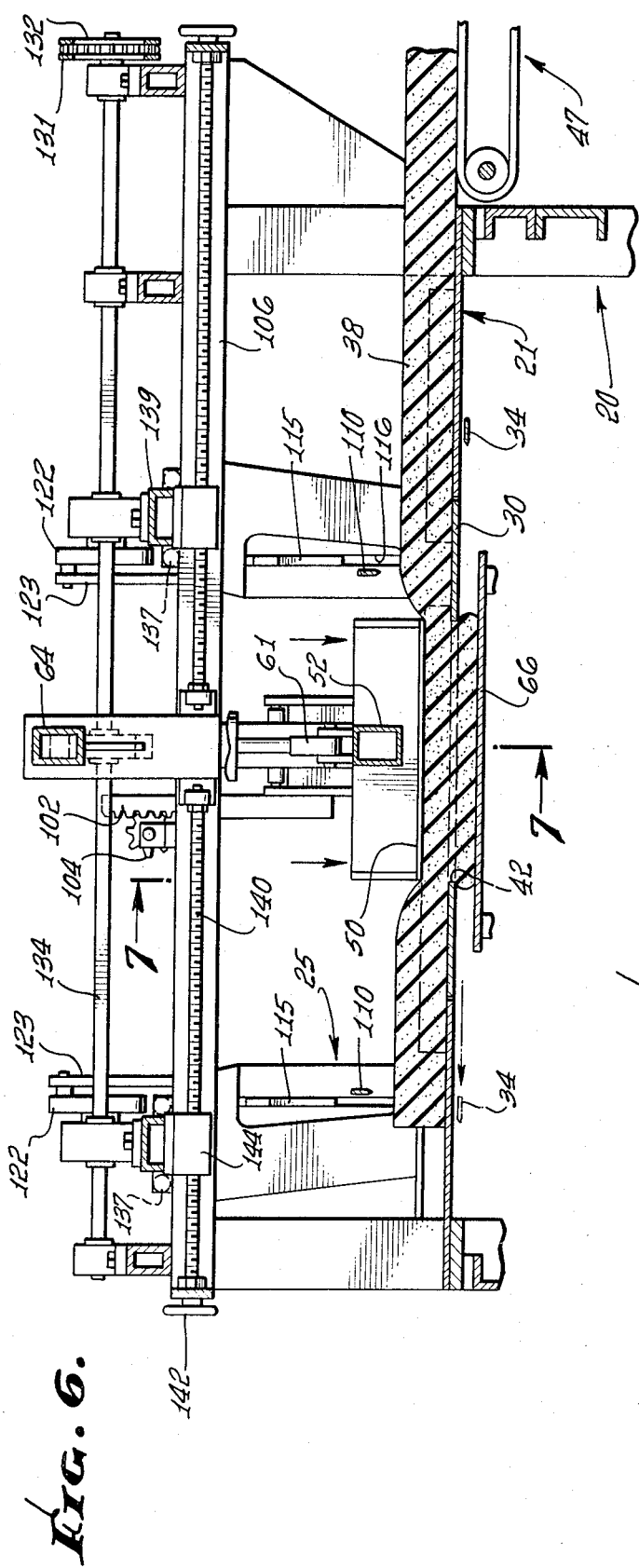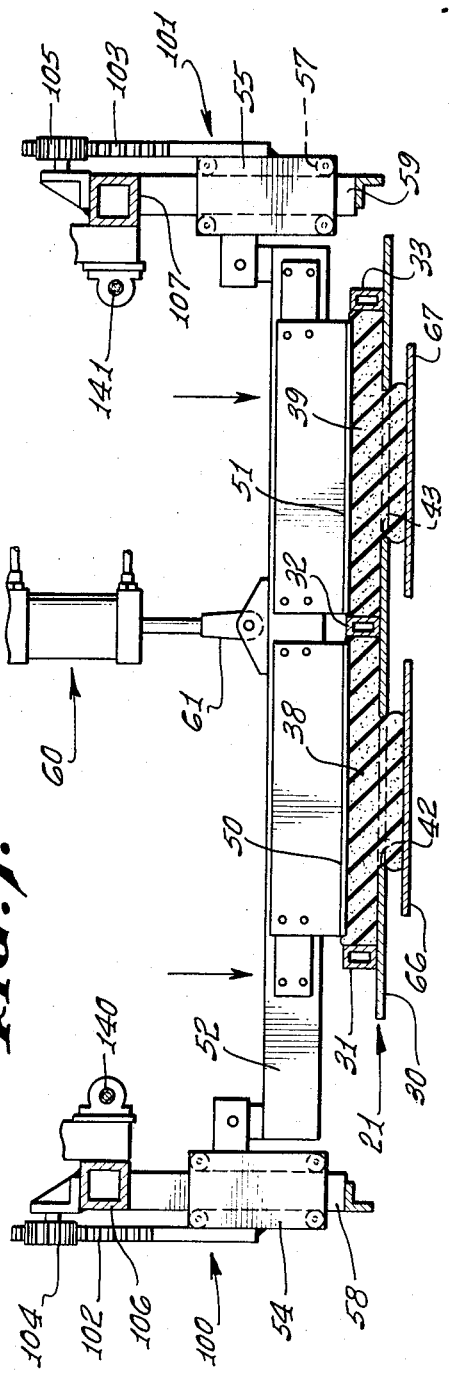

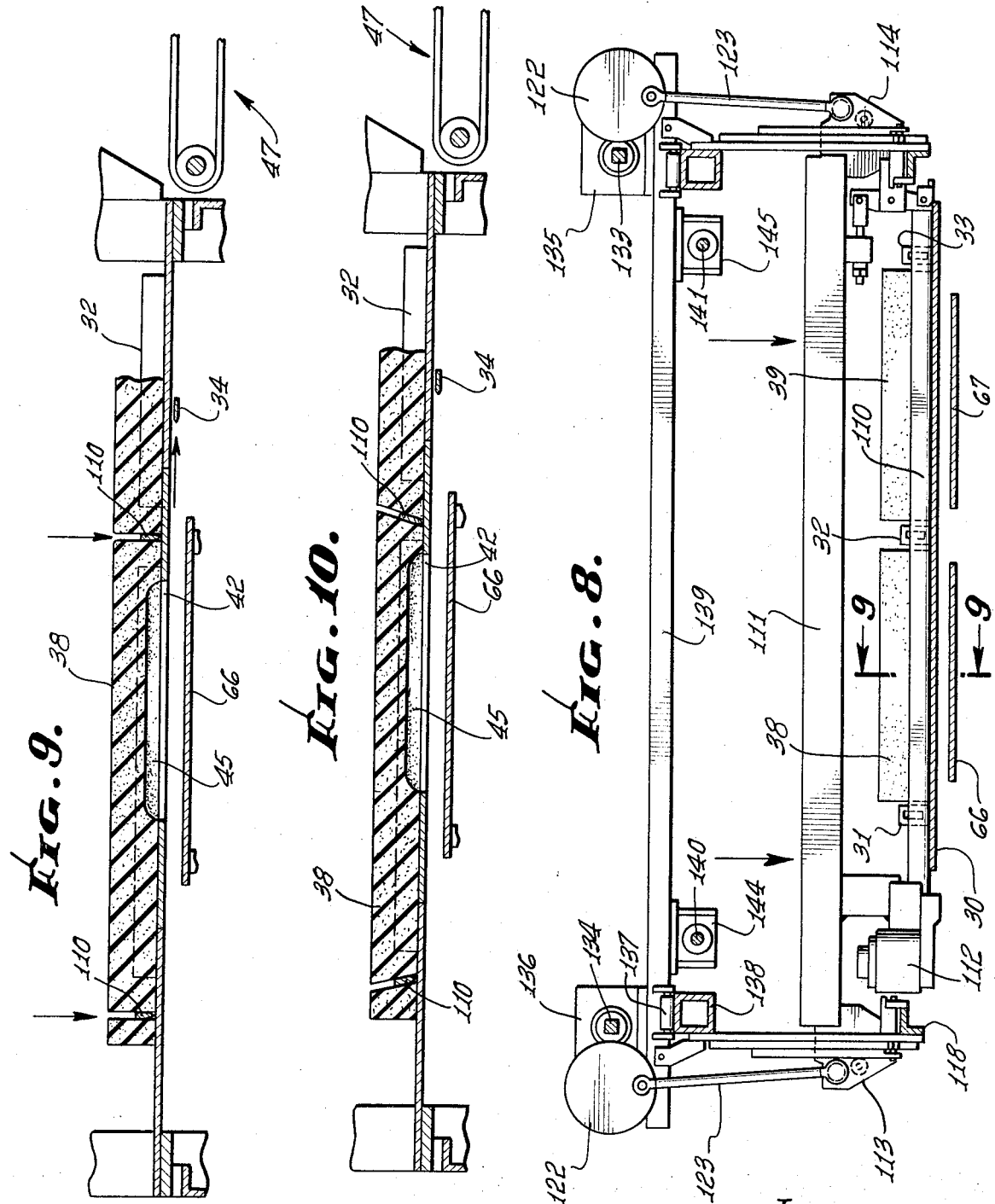

MACHINE FOR FORMING CAVITIES IN FOAM PADS AND TRIMMING SAME

BACKGROUND OF THE INVENTION

Foam rubber or urethane foam filler pads for upholstered automobile seats and other purposes have come into general use.

The seat design in many automobiles require cavities or depressions in the rear of the pads. These are for various purposes, as for example an air pocket, or a recess to accommodate parts of the seat structure.

This type of filler has been manufactured in the past by box forming, that is, moulding in a die to the finished form and dimension. This requires accurate volumetric measurement of raw materials introduced into the die, and time delay for individual reaction and curing. Another disadvantage is the requirement for box dies of numerous shapes and sizes, and differing placement and depth of the cavities in the back.

Some types of back cavities have also been formed by gouging out with a hot knife or by ripping out with a buffer. These methods are not only uneconomical but unsatisfactory because they produce irregular cavity lines and rough surfaces.

The quantity of foam pads used for automobile seats and the differing specifications for various makes and models have presented a need for a more economical and rapid mode of production than heretofore known.

There is available today urethane foam which is produced as a bun in lengths ranging from 400 to 600 feet, with a width of about 6 feet, and a height ranging from about 18 inches to 36 inches.

These buns can be cut into blanks of 6 inch thickness, or any other thickness desired, or the buns may be cut into pads of desired width and thickness thirty feet long more or less, in lengths convenient for handling.

The problem has been to provide means for rapidly operating on these blanks to cut, trim, shape them and provide cavities in the back, in an efficient manner, and produce a finished seat or back filler with a smooth surface, and ready for enclosure in fabric or mounting upon a back frame.

For certain forms of filler I have solved this problem by apparatus disclosed and claimed in my copending application, Ser. No. 71,759 filed Sept. 14, 1970 now U.S. Pat. No. 3,654,735. That apparatus does not, however, function to form the back cavities referred to.

SUMMARY OF THE INVENTION

A principal object of the present invention is to provide an apparatus which will operate on either a foam blank or pad of generally rectangular cross section, or on a pad which has been contoured, to form cavities in the back which are sharply defined, of controlled depth, and a smooth surface.

A main frame mounts a flat table or die of relatively thin material, such as steel, with an aperture or apertures therein outlining the cavities to be formed.

A foam blank or a pad of the desired width and either single or of multiple lengths is introduced by a conveyor or by hand to a predetermined location on the die.

Thereupon an overhead or primary pressure plate is caused to descend upon the pad in the region overlying the aperture or apertures. Pressure is applied to compress the foam, and where support is lacking, at an aperture, the foam bulges downward through the aperture appearing as a flat or slightly rounded mound.

If necessary, or desirable, a lower or secondary pressure plate is moved up into engagement with the mound of foam to add compression and increase the density of the foam. Thereupon, a reciprocating knife or saw travels by a worm and gear arrangement horizontally along the frame immediately below the die, and cuts off the mound of extruded foam. Optionally thereafter, reciprocating knives or saws, normally disposed above the foam, are caused to descend through it to cut through the foam at each end of a pad unit. The angle of these knives is adjustable.

The several moving parts which have been described are correlated for automatic sequential operation by means of gearing, cranks and automatic electric switches. Such means are used also to restore the several working parts to their starting position in order that the completed foam unit may be removed and a succeeding section of foam introduced into proper position.

Upon withdrawal of the pressure plates from the foam unit, the latter expands to its original density. However, the material which was present in the extruded mound is absent, resulting in a cavity of sharp outline, and even concave curvature and depth.

DESCRIPTION OF THE DRAWINGS

FIG. 6 is a longitudinal vertical section through the apparatus.

FIG. 7 is a section taken on line 7—7 of FIG. 6.

FIG. 8 is a transverse section of the apparatus taken on line 8—8 of FIG. 1.

FIG. 9 is a section taken on line 9—9 of FIG. 8 illustrating end cuts of the foam made vertically.

FIG. 10 is a view similar to FIG. 9 illustrating end cuts made at an angle.

PREFERRED EMBODIMENT OF THE INVENTION

Figure 1:
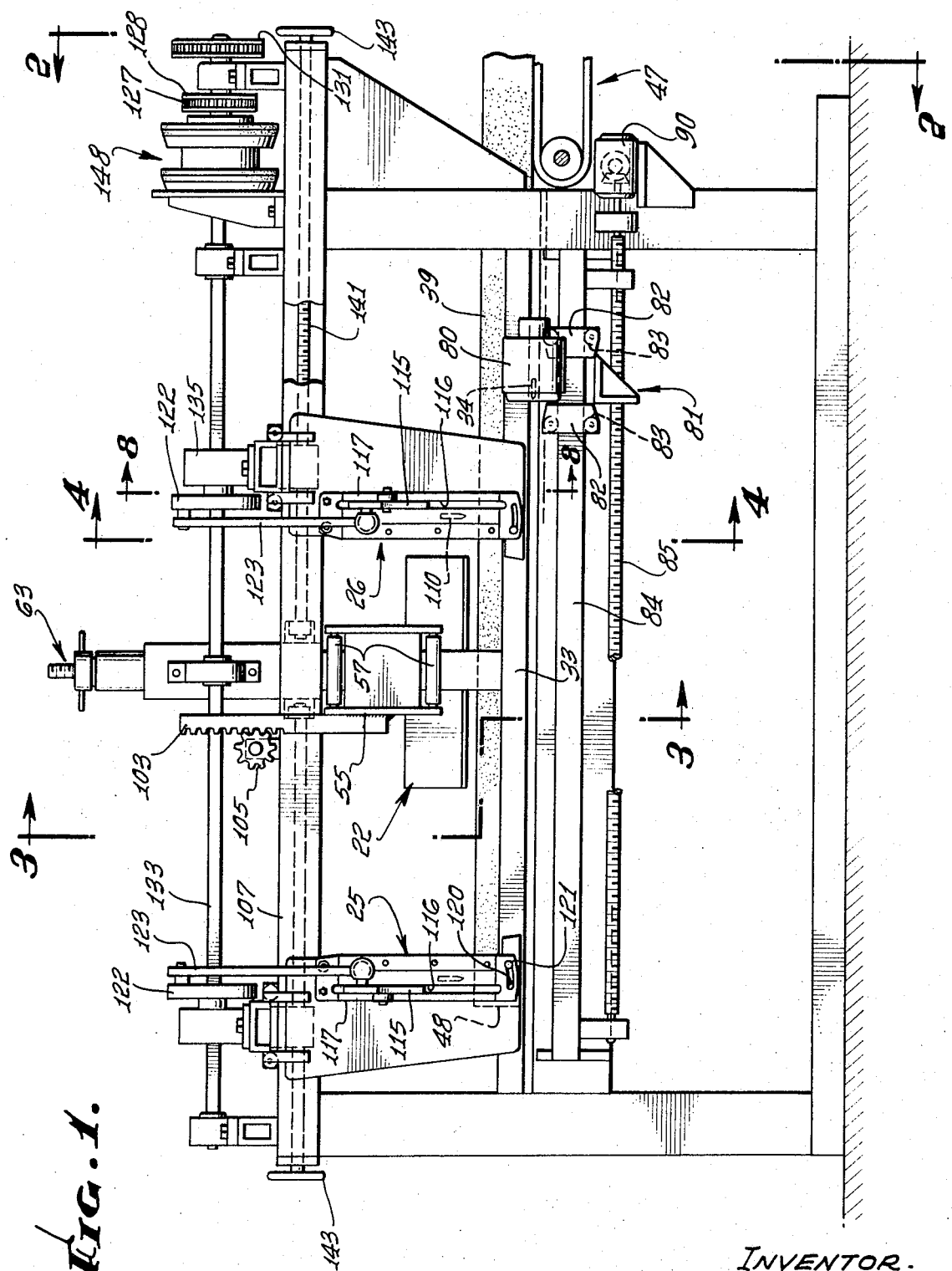
FIG. 1 is a side elevation of an apparatus embodying the invention.
Figure 2:
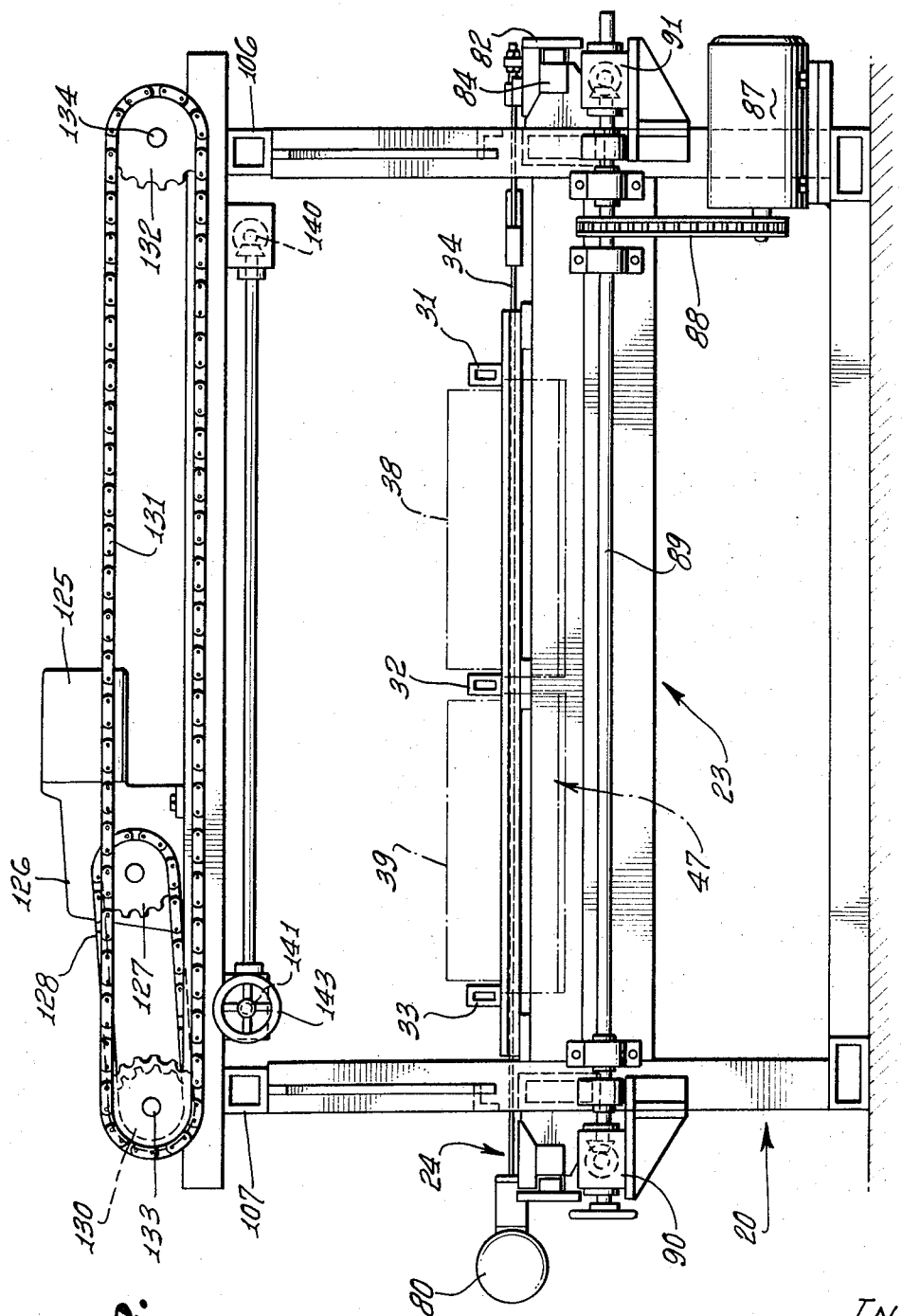
FIG. 2 is a front elevation as seen from 2—2 of FIG. 1.

The apparatus comprises in general a main frame 20, a foam blank supporting die 21, primary overhead pressure plate means 22, lower secondary pressure plate means 23, a horizontal knife assembly 24, and vertical knife assemblies 25 and 26.

The die 21 comprises a bed plate 30 carried by box beams 31, 32 and 33 which are part of the frame 20. The space immediately below the bed plate must be left clear for horizontal passage of a knife 34 which is a part of the knife assembly 24. The box beams also provide channel guides, being spaced apart approximately the width of foam blanks 38 and 39 to be operated on. By this arrangement, the die assembly 21 is in effect a dual die whereby two blanks may be processed simultaneously. This is for conservation of space and materials, but is not a requirement of the invention.

Figure 5:
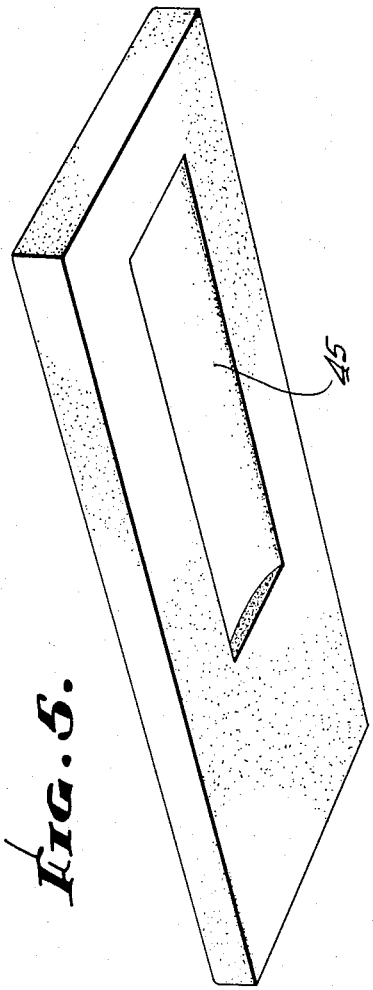
FIG. 5 is a perspective view of a foam pad with a cavity in the back as produced by the apparatus.

The bed plate 30 is formed with one or more apertures 42 and 43 in each side. The form, size and location of the apertures depends upon the type and location of cavities to be produced. For simplicity of illustration, only one aperture in each side is shown. This is rectangular to produce a cavity such as shown at 45 in FIGS. 5, 9 and 10.

For introducing foam blanks to the bed plate, a conveyor 47 may be arranged, operatable intermittently, to deliver foam blanks over the bed plate. A stop element 48 may be mounted at the opposite, or exit end of the machine so that the blanks will be correctly positioned over the die apertures.

The primary pressure plate means 22 includes a pair of flat plates 50 and 51 mounted on a cross beam 52. Opposite ends of this beam are connected to stabalizer means comprising box members 54 and 55 carrying rollers 56 and 57 which bear upon vertical posts 58 and 59. The latter are rigid components of the frame 20. The purpose is to assure true horizontal disposition of the pressure plates during their vertical movement.

The pressure plates are controlled by a hydraulic system 60 through a coupling 61. Descent of the plates against the foam blanks may be limited by a screw adjustment means 63 carried on a cross member 64 of the frame 20.

When the hydraulic system is actuated to lower the pressure plates 50 and 51 against the foam blanks 38 and 39, the foam material is extruded through the die to form a bulge or mound (See FIGS. 6 and 7).

This mound is cut off as later described in more detail. With some foam formulations, which are relatively firm, no back pressure from below is necessary for a clean sharp cut. With softer foam it is desirable to utilize the secondary pressure plate means 23.

Figure 3:
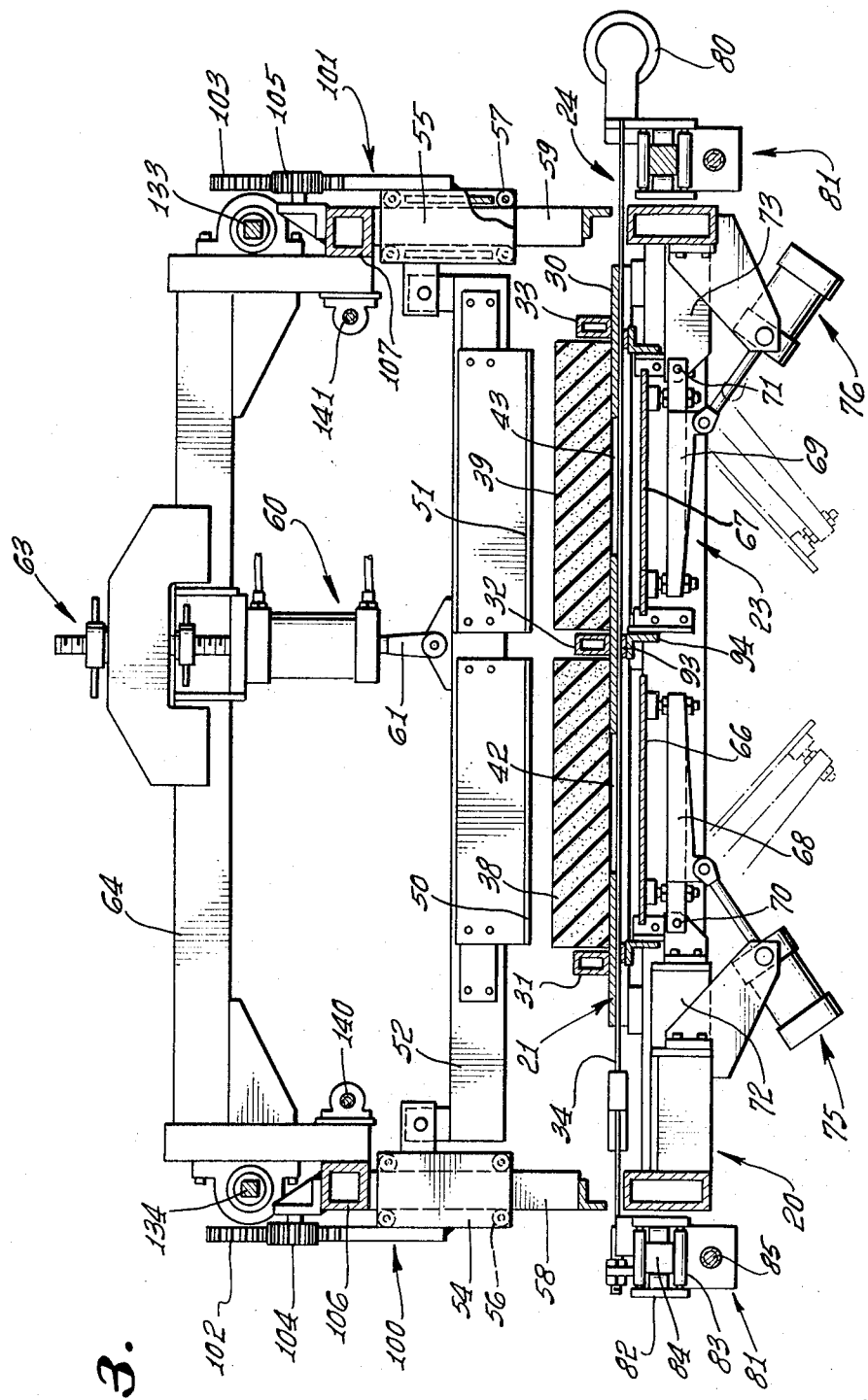
FIG. 3 is a section taken on line 3—3 of FIG. 1.

The latter includes flat plates 66 and 67, backed up by brackets 68 and 69 which are pivotally mounted at 70 and 71 on extensions 72 and 73 of the frame 20. The plates 66 and 67 when out of use repose as seen in broken lines in FIG. 3. For back pressure against the foam mounds, these plates are advanced upwardly by hydraulic systems 75 and 76. This is shown in full lines in FIGS. 3, 6 and 7. Bringing the plates 66 and 67 into functioning position may be simultaneous with the down movement of the primary pressure plates, but better results are obtained if the action is sequential following the extrusion of the foam by the primary plates.

The action of the secondary plates is to establish a reverse compression which flattens out the mound and firms up the material therein. When this is done, the action of the knife leaves a clean, sharp edge and a smooth even surface in the cavity resulting from removal of the material in the bulge and return of the blank to its original density.

The horizontal knife assembly 24 includes the knife or blade 34 which extends across the machine immediately below the die bed plate 30. It reciprocates by action of a motor 80 with conventional toggle or off center mechanism.

The knife is sustained at each end by a travelling carriage 81. Each carriage includes a cage 82 provided with rollers 83 which ride on a longitudinal bar 84 sustained by the frame 20. The knife is caused to travel longitudinally by rotation of traversing screws 85 engaging nuts (not shown) in the carriage 81. The screws are driven by a motor 87 which is reversible, so that when the knife has travelled in the direction to make the cut, the motor is reversed to return the knife to its starting position.

The motor 87 delivers power through a chain 88 to a shaft 89 which transmits rotation through gear boxes 90 and 91 to the traversing screws.

The length of the knife and its horizontal disposition make it desirable to provide blade supports 93 which are mounted on angle bars 94, auxiliary to the frame 20.

An auxiliary feature which is desirable, although not essential, resides in rack and pinion stabilizers 100 and 101, which include racks 102 and 103 welded to the boxes 54 and 55 respectively. (See FIG. 3). The racks engage free rotating pinions 104 and 105 which are journalled on fixed sections 106 and 107 of the frame 20. These rack and pinion stabilizers assist in maintaining the box members 54 and 55 in true vertical attitude during vertical travel of the crossbeam 52 carrying the pressure plates 50 and 51.

In order to finish the blank into a pad of predetermined length the vertical knife assemblies 25 and 26 are brought into function. They are similar, and description of one will suffice.

Figure 4:
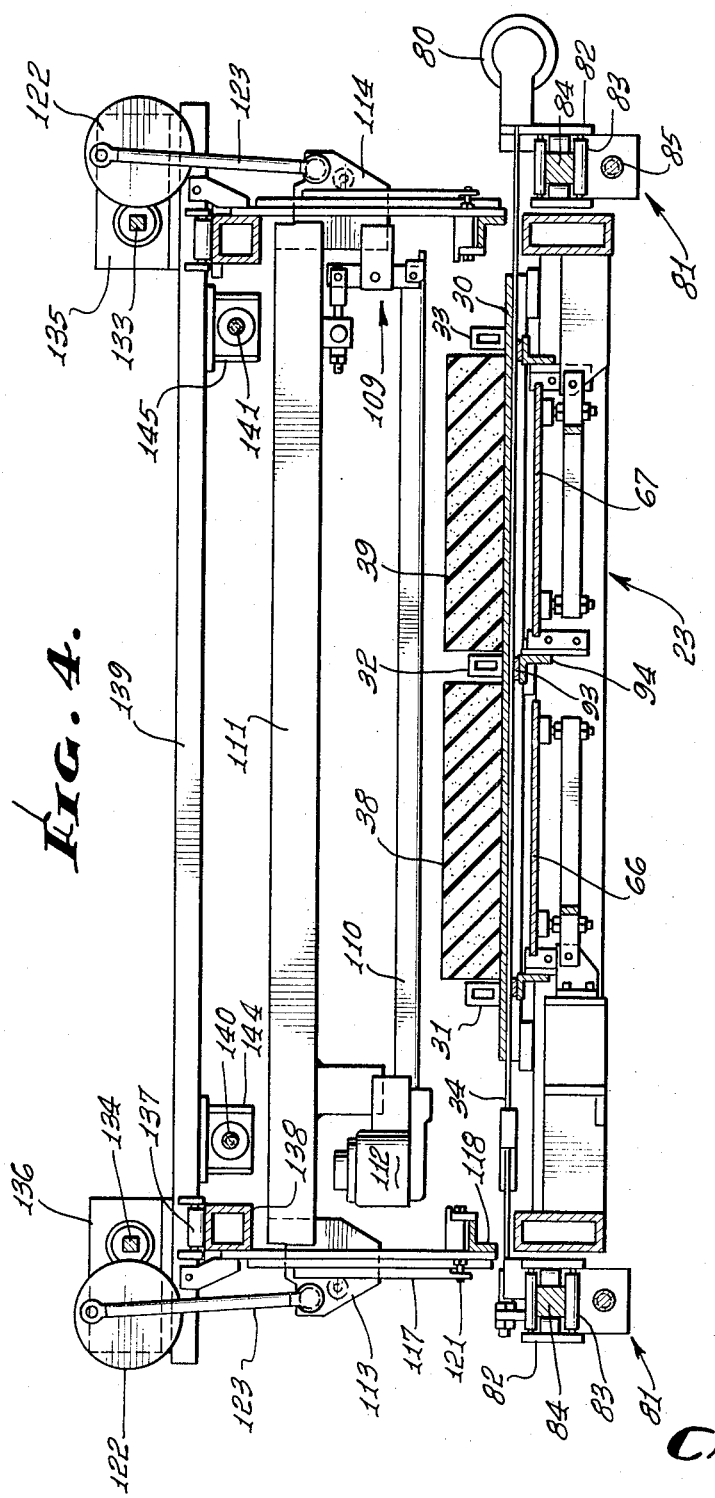
FIG. 4 is a section taken on line 4—4 of FIG. 1.

It comprises a knife or blade 110 mounted transversely of the machine (See FIG. 4) on a vertically movable support bar 111. A motor 112 for reciprocating the blade is mounted at one end, and the opposite end of the blade is supported on a pivotal mounting 112 to accommodate the reciprocation.

The ends of the support bar 111 are fixed on travel plates 113 and 114. Each plate includes a projection 115 which is slidable up and down in a slot 116 provided in a standard 117 fixedly mounted on a frame bracket 118. The standard is vertically adjustable by use of a slot 120 and locking pin 121.

The blade is caused to descend by identical bell crank assemblies each including a wheel and rod 122 and 123, respectively, the latter having a ball and socket connection with the plate 113 as shown.

The bell crank assemblies are operated from a motor 125, through a gear box 126 which drives a sprocket 127. Power is delivered from this sprocket through a chain 128 to a sprocket 130. The latter in turn drives a chain 131 which engages a sprocket 132 at the opposite side of the machine. Thus, sprockets 130 and 132 rotate simultaneously. These are keyed to shafts 133 and 134 (one at each side of the machine), which in turn are coupled through gear boxes 135 and 136 to the respective bell crank wheels.

The bell crank wheels of both knife assemblies 25 and 26 are operated simultaneously by deriving rotary power from the shafts 133 and 134.

Knife assembly 25 cuts off the blank at the forward end (See FIG. 9) and knife assembly 26 performs the same function at the rearward end. FIG. 9 illustrates a vertical cut, and FIG. 10 illustrates cut made at a slight angle, depending upon specifications being met.

Transverse grooves (not illustrated) may be formed in the upper surface of the bed plate to receive the blades in their lowermost position.

In order to provide for properly timed operation of the vertical knife assemblies a clutch 148 is interposed between the motor gear box 126 and the sprocket 127.

The clutch is controlled by any suitable conventional timing mechanism, such as an electrical switch operating in conjunction with a magnetic type clutch. It should be adjusted so that the shafts 133 and 134 will make one complete revolution for each actuation of the vertical knife assemblies.

These assemblies may be adjusted as to longitudinal position and measurement of separation. Duplicate tie rods 139 extend across the machine, and these carry the knife assemblies. The tie rods may move longitudinally by means of rollers 137 traversing longitudinal frame members 138.

The movement for the adjustment is afforded by traversing screws 140 and 141 (one for each knife assembly), operated by hand wheels 142 and 143, and engaged with travelling nut assemblies 144 and 145 mounted on the tie rods.

The foregoing is a "speaking" description, and the basic operation should be clear.

It is desirable that the several operations be sequential, and automatically timed and controlled. For this purpose the several operative elements should be coordinated by electrical circuits with limit, time, sequence or electronic eye switches for starting, stopping, or reversing the movements. These are well known devices and expedients.

Thus, for example, the placement of the foam blank in its forwardmost position may trigger a switch to start a motor in the hydraulic system for lowering the primary pressure plate. The end of that movement may actuate a switch to start a motor in the hydraulic system for raising the secondary pressure plates. Their positioning should start the motor which advances the horizontal knife, and also the motor which reciprocates it if such motor is not continuously running.

Conclusion of travel of the horizontal knife should trip a switch which reverses the motor driving the traversing screw and returns the knife to its starting position. More or less simultaneously, the end of the cutting travel of the knife should actuate the motors or valves of the hydraulic systems of both primary and secondary pressure plates, to retract them from the foam blank.

Finally, assuming that the motor to advance and retract the vertical knives is running continuously, a switch should be actuated to engage the clutch for one revolution of the shafts which lower and raise the vertical knives.

Thereupon, the finished pad be removed from the machine, and a new section of foam be moved into position.

In a machine which I have built and tested, automatic sequence controls of the nature described are incorporated; but I have omitted illustration and detailed description of them because suitable types are known and are available in commerce. Moreover, once the principles and function of the machine are disclosed, the necessary circuitry is a matter of ordinary skill in the electrical and hydraulic art.

Reference in the claims to horizontal, vertical and like designation of parts or movement is for clarity in definition by reference to the machine in the posture illustrated. The principles of the invention could be embodied in a redesign of the machine wherein the position of parts might be reversed, or the machine might in effect be turned on its side and still function as intended to obtain the end result.

Reference to hydraulic systems is by way of example only; pneumatic systems will work satisfactorily, and the two are interchangeable.

Although I have herein shown and described my invention in what I have conceived to be the most practical and preferred embodiment, it is recognized that departures may be made therefrom within the scope of my invention.

What I claim is:

1. A machine comprising a die in the form of a flat rigid plate material including a surface section for supporting a foam blank or pad and an aperture exposing a selected area portion of the lower surface of a foam pad supported on the die, a pressure plate superimposed above the die, means to advance the pressure plate against the upper surface of the foam pad whereby to extrude a fraction of the foam material through the aperture to the extent of forming a mound of the foam below the die but with a fraction of the total thickness of the foam within the outline of the aperture remaining above the die, a horizontal knife below the die and contiguous thereto, means for traversing the knife across the foam material to sever the mound, whereby a cavity in the undersurface of the pad results upon removal of the pressure and return of the foam material to its original expanded condition, and a vertical knife adapted to cut through the blank or pad to form an end thereof, and means to advance the vertical knife through the blank or pad.

2. A machine as defined in claim 1 in which there are means mounting the vertical knife which are adjustable to effect either a vertical or angular cut.

3. A machine comprising a stationary die in the form of a rigid plate presenting an elongated flat smooth surface section adapted to support a foam blank or pad for longitudinal sliding advancement over the plate or stationary lodgment thereon, and an aperture in the flat surface section adapted to expose a predetermined area portion of the lower surface of a foam pad supported on the die, a pressure plate superimposed above the die presenting a surface section having a substantially flat area greater than that of the aperture and overlying the latter with portions extending laterally beyond the perimeter of the aperture, means to force the pressure plate from an elevated position to a lowered position whereby its surface section is pressed down against the upper surface of the foam pad compressing and clamping the latter on the stationary die plate outside the perimeter of the aperture, and extruding a fraction of the foam material through the aperture to the extent of forming a mound of the foam below the die but with a fraction of the total thickness of the foam within the outline of the aperture remaining above the die, a longitudinally shiftable horizontal knife disposed below the die and contiguous thereto, and means for advancing and retracting the knife whereby in advancing it traverses the extruded foam material to sever the mound resulting in the formation of a cavity in the undersurface of the pad upon removal of the pressure, the space above the die when the pressure plate is in elevated position being free of obstruction for a sufficient height to permit unimpeded movement over the die of foam to be worked on.

4. A machine as defined in claim 3 in which the die is of a width sufficient to handle two foam blanks or pads simultaneously and there are two apertures in the die transversely separated, a longitudinal guide is positioned between the apertures to define separate channels for receiving the pads, and there are pressure plates superimposed above the die for coaction with both pads, the last named pressure plates being interconnected for simultaneous movement.

5. A machine as defined in claim 1 in which there are two vertical knives spaced horizontally apart to form both ends of the pad, and means independently mounting the knives which are adjustable to change the distance between them and to effect either a vertical or angular cut.

6. A machine as defined in claim 3 in which there is an elongated frame, the die is mounted stationary in the frame, the knife is an elongated blade type, means supported by the frame mount the knife at both ends thereof for longitudinal movement relative to the frame, the means for traversing the knife across the foam include a traversing screw and a travelling nut thereon, and means transmitting travel of the nut to the knife.

7. A machine as defined in claim 3 in which there is an elongated frame, the means to advance the pressure plate includes a cross beam on which the pressure plate is mounted, vertically movable stabilizing means carried on sections of the frame support opposite ends of the cross beam, and a fluid pressure system is coupled to the cross beam to lower and raise the beam and consequently the pressure plate.

8. A machine as defined in claim 1 in which there are means mounting the vertical knife which include a fixed standard, a plate slidable on the standard, means connecting such knife to the standard, and the means to advance such knife comprise bell crank assemblies.

9. A machine as defined in claim 1 in which both horizontal and vertical knives are reciprocable, and a reciprocating means is connected to each knife.

10. A machine as defined in claim 1 which includes a back pressure plate subjacent the bottom of the die, the back pressure plate presenting a flat surface section having an area at least as great as that of the aperture and in general vertical alignment therewith, and means to force the last named plate from a lowered position to an elevated position in pressure contact with the foam mound to increase the density thereof throughout the mound during the cutting action of the knife.

11. A machine comprising a stationary die in the form of a rigid plate presenting an elongated flat smooth surface section adapted to support a foam blank or pad for longitudinal sliding advancement over the plate or stationary lodgment thereon, and an aperture in the flat surface section adapted to expose a predetermined area portion of the lower surface of a foam pad supported on the die, a pressure plate superimposed above the die presenting a surface section having an area approximately as great as that of the aperture and in general vertical alignment therewith, means to force the pressure plate from an elevated position to a lowered position whereby its surface section is pressed down against the upper surface of the foam pad to extrude a fraction of the foam material through the aperture to the extent of forming a mound of the foam below the die but with a fraction of the total thickness of the foam within the outline of the aperture remaining above the die, a longitudinally shiftable horizontal knife disposed below the die and contiguous thereto, means for advancing and retracting the knife whereby in advancing it traverses the extruded foam material to sever the mound resulting in the formation of a cavity in the undersurface of the pad upon removal of the pressure, the space above the die when the pressure plate is in elevated position being free of obstruction for a sufficient height to permit unimpeded movement over the die of foam to be worked on, a back pressure plate subjacent the bottom of the die, the back pressure plate presenting a flat surface section having an area at least as great as that of the aperture and in general vertical alignment therewith, and means to force the last named plate from a lowered position to an elevated position in pressure contact with the foam mound to increase the density thereof throughout the mound during the cutting action of the knife.

12. A machine as defined in claim 11 in which the die is of a width sufficient to handle two foam blanks or pads simultaneously and there are apertures in the die transversely separated, a longitudinal guide is positioned between the transversely separated apertures to define separate channels for receiving the pads, pressure plates are superimposed above the die for coaction with both pads, and back pressure plates are disposed subjacent the bottom of the die, each back pressure plate being in general vertical alignment with an aperture above it and presenting a flat surface section having an area at least as great as that of the aperture with which it is aligned, and means to force each back pressure plate from a lowered position to an elevated position in pressure contact with the foam mound directly above it to increase the density thereof throughout the mound during the cutting action of the knife.

* * * * *